US008197783B2

United States Patent

(12) United States Patent
Masuda et al.

(10) Patent No.: US 8,197,783 B2
(45) Date of Patent: Jun. 12, 2012

(54) METHOD FOR SEPARATING AND RECOVERING CONVERSION REACTION GAS

(75) Inventors: Nobuhisa Masuda, Yokkaichi (JP); Noboru Tachino, Yokkaichi (JP)

(73) Assignee: Mitsubishi Materials Corporation, Tokyo (JP)

( * ) Notice: Subject to any disclaimer, the term of this patent is extended or adjusted under 35 U.S.C. 154(b) by 310 days.

(21) Appl. No.: 12/292,796

(22) Filed: Nov. 26, 2008

(65) Prior Publication Data

US 2009/0142246 A1 Jun. 4, 2009

(30) Foreign Application Priority Data

Nov. 30, 2007 (JP) ................................ 2007-309859

(51) Int. Cl.
*C01B 33/02* (2006.01)

(52) U.S. Cl. ........................................ 423/342; 423/349

(58) Field of Classification Search .................. 423/342, 423/349
See application file for complete search history.

(56) References Cited

U.S. PATENT DOCUMENTS 3,933,985 A * 1/1976 Rodgers ........................ 423/350
4,217,334 A 8/1980 Weigert et al.
4,321,246 A 3/1982 Sarma et al.
4,454,104 A 6/1984 Griesshammer et al.
6,846,473 B2 * 1/2005 Kirii et al. ..................... 423/342
7,033,561 B2 * 4/2006 Kendig et al. ................ 423/349
2003/0147798 A1 8/2003 Kirii et al.
2004/0131528 A1 7/2004 Kendig et al.

FOREIGN PATENT DOCUMENTS

JP 59-195519 11/1984
JP 60-145908 8/1985
WO WO-02/12122 2/2002

OTHER PUBLICATIONS

European Search Report dated Jul. 27, 2009 issued in EP Application No. 08170037.9.
Office Action dated Dec. 15, 2011, issued for the European patent application No. 08 170 037.9.

* cited by examiner

*Primary Examiner* — Stuart Hendrickson
*Assistant Examiner* — Richard M Rump
(74) *Attorney, Agent, or Firm* — Edwards Wildman Palmer LLP

(57) ABSTRACT

Provided is a method for separating and recovering conversion reaction gas, wherein after a conversion reaction process for producing trichlorosilane from hydrogen gas and silicon tetrachloride comprising; condensing step of cooling discharged gas, separating step of silicon tetrachloride from the condensed liquid, and recovering disilicon hexachloride. For example, the method includes a first distillation process for distilling trichlorosilane from the condensed liquid, a second distillation process for distilling silicon tetrachloride from residual liquid of the first distillation process, and a third distillation process for distilling disilicon hexachloride from residual liquid of the second distillation process.

15 Claims, 2 Drawing Sheets

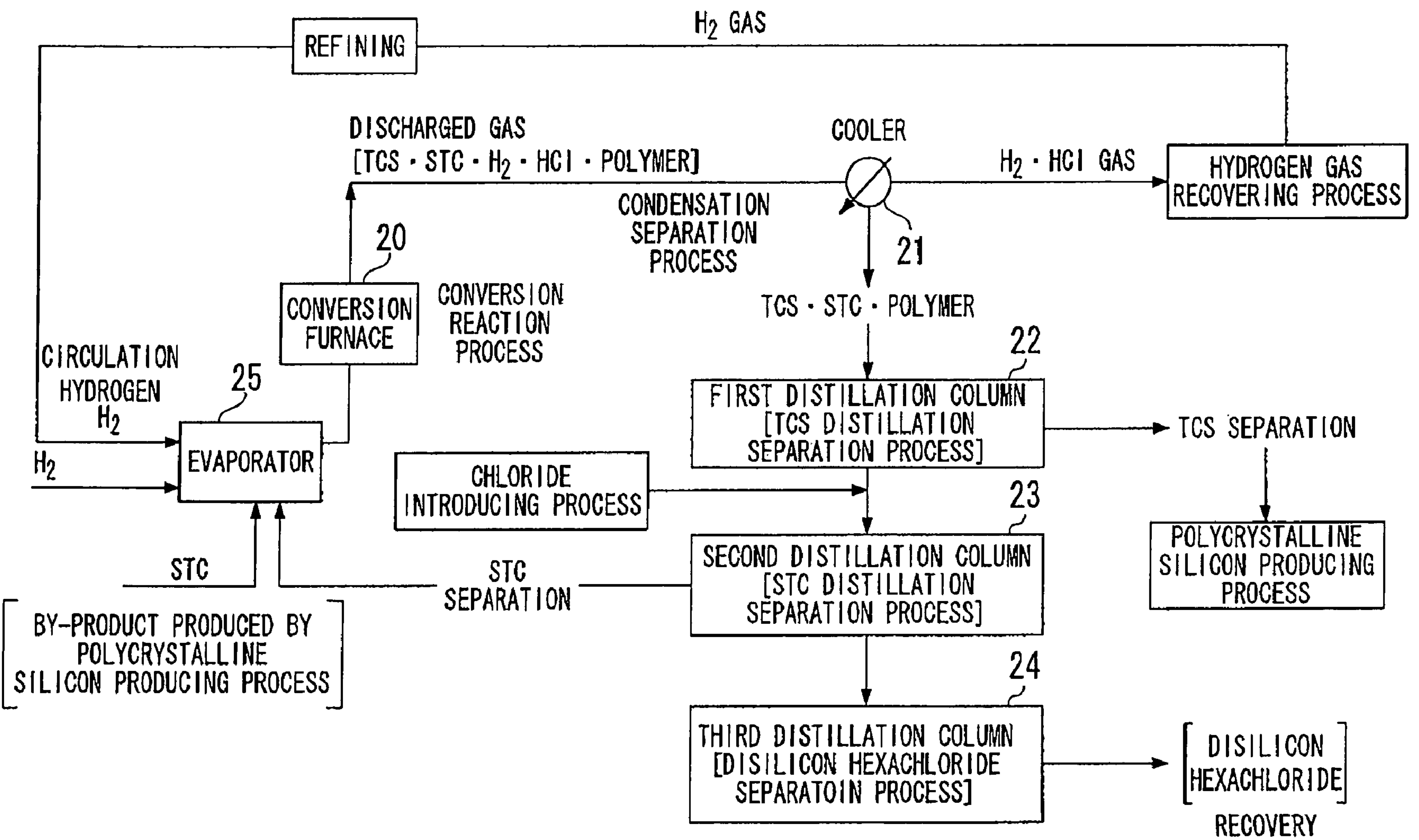
FIG. 2
REFINING
$H_2$ GAS
DISCHARGED GAS [TCS · STC · $H_2$ · HCl · POLYMER]
COOLER
$H_2$ · HCl GAS
HYDROGEN GAS RECOVERING PROCESS
CONDENSATION SEPARATION PROCESS
20
21
CONVERSION FURNACE
CONVERSION REACTION PROCESS
TCS · STC · POLYMER
CIRCULATION HYDROGEN $H_2$
25
22
EVAPORATOR
$H_2$
FIRST DISTILLATION COLUMN [TCS DISTILLATION SEPARATION PROCESS]
TCS SEPARATION
CHLORIDE INTRODUCING PROCESS
23
STC
STC SEPARATION
SECOND DISTILLATION COLUMN [STC DISTILLATION SEPARATION PROCESS]
POLYCRYSTALLINE SILICON PRODUCING PROCESS
BY-PRODUCT PRODUCED BY POLYCRYSTALLINE SILICON PRODUCING PROCESS
24
THIRD DISTILLATION COLUMN [DISILICON HEXACHLORIDE SEPARATOIN PROCESS]
[DISILICON HEXACHLORIDE] RECOVERY

METHOD FOR SEPARATING AND RECOVERING CONVERSION REACTION GAS

BACKGROUND OF THE INVENTION

1. Field of the Invention

The present invention relates to, after a conversion reaction process for producing trichlorosilane by reacting hydrogen with silicon tetrachloride discharged from a polycrystalline silicon producing process, a method for separating and recovering conversion reaction gas to separate and recover trichlorosilane and silicon tetrachloride from the discharged gas and then to recover disilicon hexachloride or the like.

Priority is claimed on Japanese Patent Application No. 2007-309859, filed Nov. 30, 2007, the content of which is incorporated herein by reference.

2. Description of Related Art

Disilicon hexachloride is useful as a raw material of an amorphous silicon film, a raw material of optical glass fiber, or a raw material of disilanes. As a method for producing disilicon hexachloride, there is known a method for separating and recovering disilicon hexachloride by cooling and condensing a mixed gas of polychlorosilane obtained by chlorination of a powdered alloy containing silicon, and separating by distillation (Japanese Patent Application Laid-Open No. 59-195519). In addition, there is known a method for producing disilicon hexachloride by reacting ferrosilicon with chlorine using a mixing horizontal reaction tube (Japanese Patent Application Laid-Open No. 60-145908).

In all the production methods, low purity silicon (metal silicon grade: purity 98 wt %) is used as a raw material, and it is difficult to avoid impurity from the raw material. Accordingly, there is a problem in that it is difficult to obtain a high-purity product. Particularly, when aluminum is mixed therein, chloride ($TiCl_4$, $AlCl_3$) thereof has a boiling point close to that of disilicon hexachloride. Therefore, it is difficult to distill and separate the chloride, and thus it is difficult to obtain high-purity disilicon hexachloride.

As a production method without such problems, there is known a method for obtaining high-purity disilicon hexachloride that does not include titanium or aluminum substantially, by distilling a high molecular silicon chloride compound (polymer) that is a by-product produced in a polycrystalline silicon producing process and recovering disilicon hexachloride (International Patent Application No. WO002/012122).

In the method for recovering disilicon hexachloride from a polymer by-produced in the polycrystalline producing process, the composition of the polymer depends on production conditions (process temperature, amount of trichlorosilane/hydrogen gas introduced) of the polycrystal silicon production process. Accordingly, when the production conditions are not constant, there is a problem in that it is difficult to stably obtain disilicon hexachloride.

Specifically, a polycrystalline silicon production process is generally a batch process in which a reaction period of 3 days to 6 days is used, and production conditions according to a growth process are controlled. Accordingly, the composition of reacted discharged gas is not uniform. For this reason, a content of disilicon hexachloride contained in the polymer is not uniform, a distillation process is not stabilized, and it is difficult to stably produce disilicon hexachloride.

SUMMARY OF THE INVENTION

The invention has been made to solve the aforementioned problems in the method for producing disilicon hexachloride, and provides a method for separating and recovering conversion reaction gas, on the basis of a conversion reaction process for producing trichlorosilane by reacting hydrogen with silicon tetrachloride discharged from a polycrystalline silicon production process. According to the invention, disilicon hexachloride is stably recovered from discharged gas of the conversion reaction process, and silicon tetrachloride or the like is efficiently recovered in a step before the process of recovering disilicon hexachloride, thereby recycling it.

The invention relates to a method for recovering chlorosilane to solve the aforementioned problems by the configuration described in the following [1] to [12].

[1] A method for separating and recovering conversion reaction gas, wherein in a conversion reaction process for producing trichlorosilane from hydrogen gas and silicon tetrachloride, discharged gas is cooled to form condensed liquid, trichlorosilane and silicon tetrachloride are separated from the condensed liquid, and then disilicon hexachloride is recovered.

[2] The method for separating and recovering conversion reaction gas according to the above [1], wherein the method includes a condensation process for cooling and condensing the discharged gas of the conversion reaction process to separate hydrogen gas, a first distillation process for flowing out trichlorosilane from the condensed liquid, a second distillation process for flowing out silicon tetrachloride from residual liquid of the first distillation process, and a third distillation process for flowing out disilicon hexachloride from residual liquid of the second distillation process.

[3] The method for separating and recovering conversion reaction gas according to the above [1], wherein the distillation of trichlorosilane and the distillation of silicon tetrachloride are continuously performed in a distillation column.

[4] The method for separating and recovering conversion reaction gas according to any one of the above [1] to [3], wherein in the distillation of disilicon hexachloride, after cutting an initial distillate, a high-temperature distillate mainly including disilicon hexachloride is recovered.

[5] The method for separating and recovering conversion reaction gas according to any one of the above [1] to [4], wherein in the distillation of disilicon hexachloride, after cutting an initial distillate, a middle distillate mainly including tetrachlorodisilane is recovered, and further a high-temperature distillate mainly including disilicon hexachloride.

[6] The method for separating and recovering conversion reaction gas according to any one of the above [1] to [5], wherein the distillation process of trichlorosilane, the distillation process of silicon tetrachloride, and the distillation process of disilicon hexachloride are sequentially and continuously performed by each of distillation columns.

[7] The method for separating and recovering conversion reaction gas according to any one of the above [1] to [6], wherein a chlorine introducing process is provided between the distillation process of trichlorosilane and the distillation process of silicon tetrachloride, between the distillation process of silicon tetrachloride and the distillation process of disilicon hexachloride, in the course of the distillation process of silicon tetrachloride, or in the course of the distillation process of disilicon hexachloride.

[8] The method for separating and recovering conversion reaction gas according to the above [7], wherein after introducing chlorine to each of the distillation processes, chlorine remaining in residual liquid of distillation is degassed.

[9] The method for separating and recovering conversion reaction gas according to the above [7], wherein inert gas is introduced to residual liquid of distillation to degas chlorine by bubbling.

[10] The method for separating and recovering conversion reaction gas according to any one of the above [7] to [9], wherein after any one of the distillation process of trichlorosilane, the distillation process of silicon tetrachloride, and the distillation process of disilicon hexachloride, chlorine is introduced to residual liquid of distillation to allow chlorination to progress, residual chlorine is degassed, and then the residual liquid is introduced to the next distillation process.

[11] The method for separating and recovering conversion reaction gas according to any one of the above [7] to [9], wherein after any one of the distillation process of trichlorosilane, the distillation process of silicon tetrachloride, and the distillation process of disilicon hexachloride, chlorine is introduced to residual liquid of distillation to allow chlorination to progress, residual liquid including the chlorine is led to the next distillation process, and the chlorine is degassed in the next distillation step.

[12] The method for separating and recovering conversion reaction gas according to any one of the above [1] to [11], wherein in a conversion reaction process for producing trichlorosilane from hydrogen gas and silicon tetrachloride, the silicon tetrachloride by discharged from the polycrystalline silicon producing process is used as raw material gas.

The separating and recovering method of the invention does not recover disilicon hexachloride from a polymer that is a by-product produced in the process for producing polycrystalline silicon, but separates and recovers trichlorosilane from discharged gas of a conversion reaction process for producing trichlorosilane using silicon tetrachloride included in discharged gas of the polycrystalline silicon production process as a raw material and then recovers disilicon hexachloride. According to the separating and recovering method of the present invention, a recovery ratio of disilicon hexachloride is higher than that of a method for recovering disilicon hexachloride from discharged gas of the polycrystalline silicon producing process, and thus it is possible to stably distill and separate disilicon hexachloride or the like.

Disilicon hexachloride obtained by the method of the invention has a high purity since it is separated and recovered from the conversion reaction process of the polycrystalline silicon production. In addition, according to the invention, since trichlorosilane is separated and recovered and then disilicon hexachloride is separated and recovered, it is possible to improve use efficiency of the whole conversion-reaction produced gas.

BRIEF DESCRIPTION OF THE DRAWINGS

FIG. 2 is a process diagram illustrating a separating and recovering device according to the invention.

DESCRIPTION OF REFERENCE NUMERALS AND SIGNS

Figure 1:
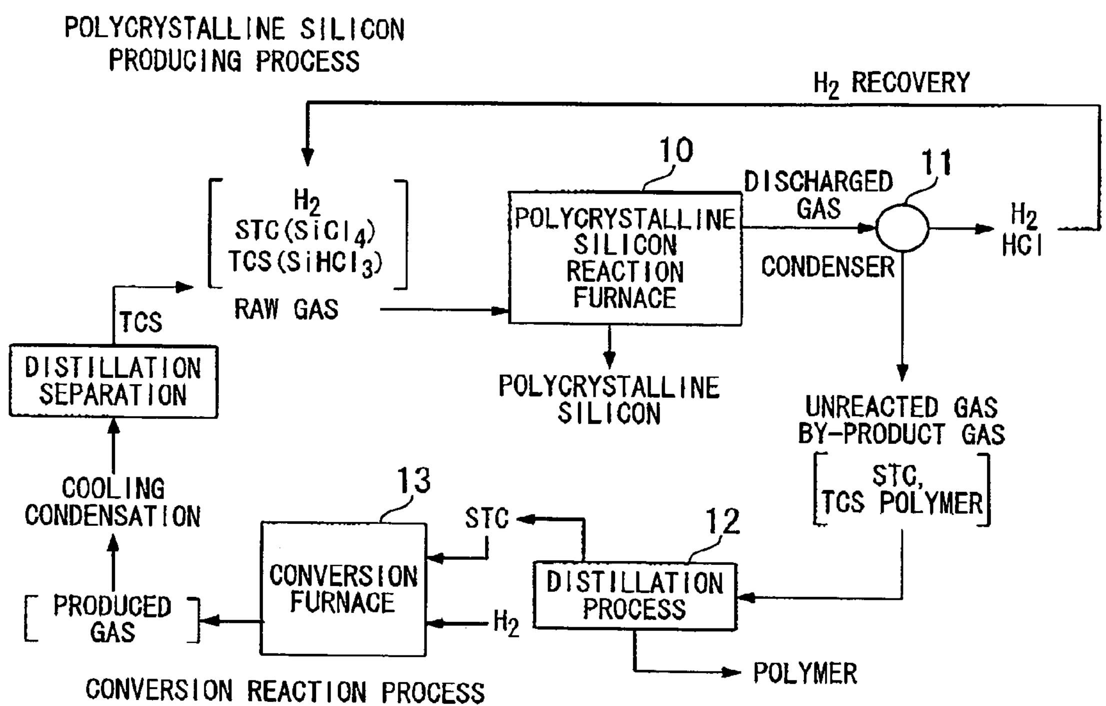
FIG. 1 is a process diagram illustrating a process for producing polycrystalline silicon and a conversion reaction process.

10: REACTION FACE
11: CONDENSER (CONDENSATION PROCESS)
12: DISTILLATION PROCESS
13: CONVERSION FURNACE
20: CONVERSION FURNACE
21: CONDENSER
22: FIRST DISTILLATION COLUMN
23: SECOND DISTILLATION COLUMN
24: THIRD DISTILLATION COLUMN
25: EVAPORATOR

DETAILED DESCRIPTION OF THE INVENTION

Hereinafter, the invention will be described with reference to an embodiment.

A separating and recovering method of the invention is a method for separating and recovering disilicon hexachloride (abbreviated to 6CS) or the like from gas discharged by a conversion reaction process related to a polycrystalline silicon producing process. FIG. 1 shows the process for producing polycrystalline silicon and the conversion reaction process.

In the production process shown in FIG. 1, polycrystalline silicon is produced using trichlorosilane ($SiHCl_3$: TCS) and hydrogen as raw materials, by a hydrogen reduction reaction represented by the following formula (1) and a pyrolysis reaction represented by the following formula (2).

$$SiHCl_3+H_2 \rightarrow Si+3HCl \quad (1)$$

$$4SiHCl_3 \rightarrow Si+3SiCl_4+2H_2 \quad (2)$$

A polycrystalline silicon reaction furnace 10 is provided with a silicon rod therein, silicon produced by the reactions (1) and (2) is deposited on a surface of a silicon rod (about 800° C. to 1200° C.) grown in the furnace by the reactions, and the silicon rod gradually grows to a polycrystalline silicon rod having a large diameter.

Gas discharged from the reaction furnace 10 includes by-produced hydrogen chloride (HCl), silicon tetrachloride (STC), and chlorosilanes such as dichlorosilane and hexachlorodisilane (disilicon hexachloride), together with unreacted trichlorosilane (TCS) and hydrogen. Discharged gas including these chlorosilanes is led to a condenser 11, is cooled to about −60° C. (e.g., −65° C. to −55° C.), and is condensed to liquid. In this case, hydrogen that is not liquidized and remains in a gaseous state is separated, and the hydrogen is supplied to the reaction furnace 10 again as a part of raw material gas through a refining process and is reused.

The condensed liquid including the chlorosilanes liquidized by the condenser 11 is introduced to a distillation process 12, trichlorosilane (TCS) is distilled and separated, and the recovered TCS is returned to the polycrystalline silicon production process and is reused.

Subsequently, silicon tetrachloride (STC) is distilled and separated. The silicon tetrachloride is introduced to a conversion furnace 13, and trichlorosilane (TCS) is produced by a hydrogen-addition conversion reaction represented by the following formula (3). The produced gas including the TCS is introduced to a cooling and condensing process, and the separated and recovered TCS is returned to the polycrystalline silicon production process and is used as a raw material for producing polycrystalline silicon.

$$SiCl_4+H_2 \rightarrow SiHCl_3+HCl \quad (3)$$

The separating and recovering method of the present invention is a method for separating and recovering conversion reaction gas characterized in that trichlorosilane (TCS) is distilled and separated from condensed liquid of gas produced in the conversion reaction process, and then disilicon hexachloride (6CS) is recovered using the residual liquid of the distillation.

A concrete example of the separating and recovering method of the invention is shown in FIG. 2. In a processing system shown in FIG. 2, silicon tetrachloride distilled and separated from discharged gas of a polycrystalline silicon producing process is introduced to a conversion furnace 20 through an evaporator 25, together with hydrogen gas. The conversion furnace 20 has an in-furnace temperature set in the range of about 1000° C. to 1300° C., and hydrogen and silicon tetrachloride (STC) react to produce chlorosilanes.

The gas discharged from the conversion furnace 20 is, for example, mixed gas of trichlorosilane (12 to 22 wt %), unreacted silicon tetrachloride (68 to 78 wt %), hydrogen gas (1.5 to 2.5 wt %), hydrogen chloride gas (0.5 to 1.0 wt %), dichlorosilane (0.5 to 1.0 wt %), and polymer chlorine compound (1.3 to 1.8 wt %) including disilicon hexachloride.

The gas (about 600° C. to 1100° C.) discharged from the conversion furnace 20 is led to a condenser 21, and is cooled to about −70° C. (e.g., −70° C. to −80° C.) (condensation process). In this case, hydrogen remaining in a gaseous state is separated, is refined through a hydrogen gas recovering process, is returned to the conversion furnace 20 as a part of raw material gas, and is reused.

The condensed liquid separated in the condensation process includes chlorosilanes such as trichlorosilane, monochlorosilane, and dichlorosilane, silicon tetrachloride, and polymer containing the other silicon chloride compounds. The condensed liquid is led to a first distillation separation process (first distillation column 22), an overhead temperature is set as a distillation temperature of trichlorosilane (TCS), and trichlorosilane is recovered. The distillation temperature is set in a range of 33° C. to 55° C. under a pressure of 0 to 0.1 MPa, which is equal to or higher than a boiling point of trichlorosilane and is lower than a boiling point of silicon tetrachloride (STC).

The distilled and separated trichlorosilane (TCS) is returned to the reaction furnace 10, and can be reused as a part of raw materials for producing silicon. Monochlorosilane (boiling point: about −30° C.) or dichlorosilane (boiling point: about 8.2° C.) included in discharged gas has a boiling point lower than that of trichlorosilane (boiling point: about −33° C.), and is prior to trichlorosilane. Accordingly, monochlorosilane or dichlorosilane is recovered early and can be separated from trichlorosilane. Since monochlorosilane or dichlorosilane is highly pure, it is possible to use monochlorosilane or dichlorosilane as a raw material of silicon for semiconductor or amorphous silicon. Since a boiling point (about 58° C.) of silicon tetrachloride is higher than that of above chlorosilanes, silicon tetrachloride is discharged from a bottom of columns in the first distillation process.

The residual liquid of the distillation in the first distillation process (first distillation column 22) is led to a second distillation process (second distillation column 23) that is the next process, an overhead temperature is set as a distillation temperature of silicon tetrachloride (STC), and the silicon tetrachloride is recovered. The distillation temperature is set in a range of 57° C. to 80° C. under a pressure of 0 to 0.1 MPa, which is equal to or higher than a boiling point of silicon tetrachloride and is lower than a boiling point of disilicon hexachloride. In the distillation process, silicon tetrachloride is distilled, and polymer including a high-boiling point part remains in the liquid. The recovered silicon tetrachloride is returned to the conversion reaction process, and can be reused as raw material gas of the conversion reaction.

The residual liquid of the distillation in the second distillation process (second distillation column 23) is led to a third distillation process (third distillation column 24), an overhead temperature is set as a distillation temperature of disilicon hexachloride (Si2Cl6: 6CS), and the distilled disilicon hexachloride is recovered. The distillation temperature is The distillation temperature is set in a range of 144° C. to 165° C. under a pressure of 0 to 0.1 MPa, which is equal to or higher than a boiling point of disilicon hexachloride and is lower than lower than high boiling point.

In the distillation process (third distillation process) of disilicon hexachloride, initial distillate having a low distillation temperature includes silicon tetrachloride remaining in the liquid, and thus the initial distillate is cut. Subsequently, when the distillation temperature gradually rises, tetrachlorodisilane ($Si_2H_2Cl_4$: boiling point about 135° C. to 140° C.) is distilled. Accordingly, this middle distillate is cut or is separated and recovered as necessary. When the distillation temperature reaches the boiling point (boiling point: about 144° C.) of disilicon hexachloride, high-purity disilicon hexachloride is distilled. Therefore, the disilicon hexachloride is recovered.

For example, initial distillate lower than 135° C. mainly includes silicon tetrachloride, and middle distillate of 135° C. to 149° C. mainly includes tetrachlorodisilane. High-temperature distillate of 149° C. to 150° C. mainly includes disilicon hexachloride. When the temperature is over 150° C., a compound with a high boiling point is distilled. Accordingly, the distillation is stopped before the compound is distilled. The residual liquid of the distillation includes trisilicon octachloride, tetrasilicon decachloride, and the like.

In above production process, a process to introduce chlorine process is provided between the distillation separation process of silicon tetrachloride and the distillation separation process of disilicon hexachloride, decomposition, chlorination, and dehydration of polymer components are allowed to progress by adding chlorine gas to the residual liquid discharged from the distillation separation process of silicon tetrachloride, and it is led to the distillation process of disilicon hexachloride, thereby raising a yield of disilicon hexachloride. The amount of the introduced chlorine gas may be about 5% to 10% of the amount of the liquid discharged from the distillation separation process of silicon tetrachloride.

The process to introduce chlorine process is not limited to that between the distillation separation process of silicon tetrachloride and the distillation of disilicon hexachloride, and may be provided between the distillation process of trichlorosilane and the distillation process of silicon tetrachloride, in the course of the distillation of silicon tetrachloride, or in the course of the distillation process of disilicon hexachloride. In any case, it is possible to raise a yield of disilicon hexachloride by allowing chlorination to progress by adding chlorine to the residual liquid of the distillation.

When the process to introduce chlorine is provided and chlorine remains in the liquid introduced to the distillation column, residual chlorine and distillation components react in the course of distillation and thus powder may be produced. The powder is attached to the inside of the distillation system causing scale, deterioration of flow of liquid or gas, or errors in indication of a flowmeter, thereby causing a negative effect such as instability of distillation. In addition, the powder is mixed with the distilled disilicon hexachloride, thereby decreasing purity of the recovered disilicon hexachloride.

Thus, when chlorine gas is introduced to the residual liquid after distillation, it is preferable to provide a process for degassing the residual chlorine. As device for degassing chlorine gas, there is a method for introducing inert gas such as nitrogen and argon to the residual liquid, to which chlorine has been introduced, and bubbling, a method for heating in a vacuum, and the like. The amount of the introduced inert gas may be about three times that of the previously introduced chlorine gas.

The introduction of chlorine and the degassing of residual chlorine may be performed between any processes or in the course of any distillation process, and further may be performed stepwise. The process for degassing residual chlorine may be continuously performed after the introduction of chlorine, or may be performed in the next distillation process. That is, after at least any one of the distillation process of chlorosilane, the distillation process of silicon tetrachloride, and the distillation process of disilicon hexachloride, chlorine is introduced to residual liquid to allow chlorination to progress, the residual chlorine is degassed, and then the residual liquid is led to the next distillation process. Alternatively, chlorine is introduced to residual liquid allow chlorination to progress, and then the residual liquid is led to the next distillation process to degas the chlorine.

In the shown example of the production process, the first distillation process of trichlorosilane, the second distillation process of silicon tetrachloride, and the third distillation process of disilicon hexachloride are continuously performed in the individual distillation columns 22, 23, and 24, respectively, but the invention is not limited thereto. By controlling the distillation temperature, for example, the first distillation column 22 and the second distillation column 23 may be embodied in the same distillation column, the second distillation column 23 and the third distillation column 24 may be embodied in the same distillation column, or the distillation processes may be performed by any combination. In addition, the distillation separation process of disilicon hexachloride of the third distillation column 24 is not limited to batch distillation, and may be continuous distillation.

When the distillation (distillation column 22 of the first distillation process) of trichlorosilane and the distillation (distillation column 23 of the second distillation process) of silicon tetrachloride are continuously performed by the same distillation process, the distillation gas including the recovered trichlorosilane and silicon tetrachloride is introduced to the distillation column again. Then, trichlorosilane and silicon tetrachloride are distilled and separated, the trichlorosilane is used as a raw material for producing polycrystalline silicon, and the silicon tetrachloride is used as a raw material of a conversion reaction.

EXAMPLES

Hereinafter, examples of the present invention will be described together with comparative examples. As shown in Table 1 and Table 2, the recovered amount of disilicon hexachloride of the examples is larger than that of the comparative examples, and thus a recover ratio is drastically improved.

Examples 1 to 4

Silicon tetrachloride (90 to 120 L/min) was evaporated by an evaporator 25, hydrogen gas (30 to 50 $Nm^3/min$) was mixed therein, the mixed gas was introduced to a conversion furnace 20 heated to 1000 to 1300° C. therein, and trichlorosilane was discharged. The produced gas had a composition ratio of trichlorosilane (15 to 22 wt %), unreacted silicon tetrachloride (68 to 78 wt %), hydrogen gas (1.5 to 2.5 wt %), hydrogen chloride gas (0.5 to 1.0 wt %), dichlorosilane (0.5 to 1.0 wt %), and polymer chlorine compound (1.3 to 1.8 wt %) including disilicon hexachloride.

The produced gas was introduced to a condenser 21 of a condensation process, and was cooled to about −75° C. (−70° C. to −80° C.). At that time, hydrogen remaining in a gaseous state was separated, and chlorosilanes such as trichlorosilane were liquidized to form condensed liquid. The separated hydrogen gas was sent to a refining process, returned to the conversion furnace 20 as a part of raw material gas, and was reused.

The condensed liquid was led to a distillation separation process, an overhead temperature of a first distillation column 22 was set as a distillation temperature of trichlorosilane, and the distilled trichlorosilane was recovered. The distillation temperature was set at a temperature range 33 to 55° C. under pressure of 0 to 0.1 MPa, and was equal to or higher than the boiling point of trichlorosilane and lower than the boiling point of silicon tetrachloride. The recovered trichlorosilane was reused as a raw material for producing polycrystalline silicon.

The residual liquid of the distillation in the first distillation column 22 was led to a second distillation column 23, an overhead temperature was set as a distillation temperature of silicon tetrachloride, and the distilled silicon tetrachloride was recovered. The distillation temperature was set at a temperature range 57° C. to 80° C. under pressure of 0 to 0.1 MPa, and was equal to or higher than a boiling point of silicon tetrachloride and lower than a boiling point of disilicon hexachloride. In the distillation process, silicon tetrachloride was distilled, and polymer silicon chloride compound remained in the liquid. The recovered silicon tetrachloride was reused as a raw material of the conversion process to trichlorosilane and a raw material for producing polycrystalline silicon.

Fifty kilograms of residual liquid of the distillation in the second distillation column 23 was taken, the residual liquid was led to a third distillation column 24, and an overhead temperature was set as 150° C. to perform distillation. First, initial distillate at a distillation temperature of 31° C. to 135° C. was separated, distillate (middle distillate) at 135° C. to 150° C. was further separated, and then distillate at 149° C. to 150° C. was recovered. Distillation components over 150° C. were cut.

Table 1 shows flow rates of the hydrogen gas and silicon tetrachloride introduced to the conversion furnace 20, and a recovered amount and a recover ratio of disilicon hexachloride. The recovered amount of disilicon hexachloride is an amount included in the distilled part at 149° C. to 150° C., and a recovery ratio of disilicon hexachloride is a ratio of 6CS to 50 kg of the residual liquid of distillation.

TABLE 1

| | Conversion Process to Trichlorosilane | | Distillation Process of Disilicon Hexachloride | |
|---|---|---|---|---|
| | STC Input (L/min) | H2 Input ($Nm^3/min$) | 6CS Recovery (kg) | 6CS Recovery Ratio (%) |
| Ex. 1 | 60 | 20 | 8.4 | 16.8 |
| Ex. 2 | 100 | 30 | 8.0 | 16.0 |
| Ex. 3 | 100 | 40 | 9.6 | 19.2 |
| Ex. 4 | 120 | 60 | 10.4 | 20.8 |
| Difference between Maximum Minimum of 6CS Recovery Ratio | | | | 4.8 |

Comparative examples of disilicon hexachloride recovered from reacted discharged gas of a polycrystalline silicon production process are shown hereinbelow.

Comparative Examples 1 to 4

Trichlorosilane (20 to 35 L/min) and hydrogen (25 to 55 $m^3/min$) were introduced to a polycrystalline silicon reaction furnace 10, a silicon lod surface of which was heated to 1000° C. to 1100° C., and polycrystalline silicon was grown. Reacted discharged gas was introduced to a condenser 11, the first distillation process, the second distillation process, and the third distillation process were performed under the same conditions as Example 1, and disilicon hexachloride was recovered. The recovered amount and recovery ratio of the distilled and separated disilicon hexachloride are shown in Table 2.

TABLE 2

| | Polycrystalline Silicon Reaction Process | | Distillation Process of Disilicon Hexachloride | |
|---|---|---|---|---|
| | TCS Input (L/min) | H2 Input ($Nm^3$/min) | 6CS Recovery (kg) | 6CS Recover Ratio (%) |
| Comp. 1 | 20 | 29 | 0.9 | 1.8 |
| Comp. 2 | 25 | 34 | 3.5 | 7.0 |
| Comp. 3 | 30 | 54 | 6.2 | 12.4 |
| Comp. 4 | 35 | 54 | 2.9 | 9.6 |
| | Difference between Maximum and Minimum of 6CS Recovery Ratio | | | 10.6 |

Examples 5 to 8

The same produced gas as Examples 1 to 4 was obtained from the conversion furnace 20. The produced gas was introduced to a condenser 21 of a condensation process, was cooled to about −75° C. (−70° C. to −80° C.), hydrogen remaining in a gaseous state was separated, and then chlorosilanes such as trichlorosilane were liquidized to form condensed liquid. The separated hydrogen gas was sent to a refining process, returned to the conversion furnace 20, and then was reused as a part of raw material gas.

The condensed liquid was introduced to a distillation separation process. In the first distillation process, a distillation temperature was equal to or higher than a boiling point of silicon tetrachloride and was set at a temperature (57° C. to 80° C. under pressure of 0 to 0.1 MPa) lower than a boiling point disilicon hexachloride, and trichlorosilane and silicon tetrachloride were distilled and recovered in the same distillation column.

Fifty kilograms of the residual liquid of distillation in the first distillation process was taken and was led to the next distillation column, an overhead temperature was set as 150° C., and then distillation was performed. First, initial distillate at a distillation temperature of 31° C. to 135° C. was separated, distillate (middle distillate) at 135° C. to 150° C. was further separated, and then distillate at 149° C. to 150° C. was recovered. Distillation components over 150° C. were cut.

Table 1 shows flow rates of the hydrogen gas and silicon tetrachloride introduced to the conversion furnace 20, and a recovered amount and a recovery ratio of disilicon hexachloride. The recovered amount of disilicon hexachloride is an amount included in the distilled part at 149° C. to 150° C., and a recovery ratio of disilicon hexachloride is a ratio of 6CS to 50 kg of the residual liquid of distillation.

TABLE 3

| | Conversion Process to Trichlorosilane | | Distillation Process of Disilicon Hexachloride | |
|---|---|---|---|---|
| | STC Input (L/min) | H2 Input ($Nm^3$/min) | 6CS Recovery (kg) | 6CS Recover Ratio (%) |
| Ex. 5 | 60 | 20 | 7.8 | 15.6 |
| Ex. 6 | 100 | 30 | 7.9 | 15.8 |
| Ex. 7 | 100 | 40 | 9.4 | 16.0 |
| Ex. 8 | 120 | 60 | 9.6 | 19.2 |
| | Difference between Maximum and Minimum of 6CS Recovery Ratio | | | 3.6 |

Comparative Examples 5 to 8

Trichlorosilane (20 to 35 L/min) and hydrogen (25 to 55 $m^3$/min) were introduced to a polycrystalline silicon reaction furnace 10, a silicon lod surface of which was heated to 1000° C. to 1100° C., and polycrystalline silicon was grown. Reacted discharged gas was introduced to a condenser 11, the first distillation process, the second distillation process, and the third distillation process were performed under the same conditions as Example 5, and disilicon hexachloride was recovered. The recovered amount and recovery ratio of the distilled and separated disilicon hexachloride are shown in Table 2.

TABLE 4

| | Polycrystalline Silicon Reaction Process | | Distillation Process of Disilicon Hexachloride | |
|---|---|---|---|---|
| | TCS Input (L/min) | H2 Input ($Nm^3$/min) | 6CS Recovery (kg) | 6CS Recover Ratio (%) |
| Comp. 5 | 20 | 29 | 1.2 | 2.4 |
| Comp. 6 | 25 | 34 | 2.6 | 5.2 |
| Comp. 7 | 30 | 54 | 5.8 | 11.6 |
| Comp. 8 | 35 | 54 | 3.1 | 6.2 |
| | Difference between Maximum and Minimum of 6CS Recover Ratio | | | 9.2 |

Example 9

Distillation was performed in the same manner as Example 1 except that chlorine gas (3.2 kg) was introduced to 50 kg of the residual liquid of distillation (introduced liquid) of the second distillation column 23. As a result, disilicon hexachloride of 64% of the amount of the introduced liquid was recovered.

Example 10

Chlorine gas (3.2 kg) was introduced to 50 kg of residual liquid of distillation (introduced liquid) in the second distillation column 23, chlorination was allowed to progress, nitrogen gas was introduced at a flow rate of 40 NL/min for 200 minutes to perform bubbling (introduced amount: 10.0 kg), and chlorine in the liquid was removed. The degassed liquid was led to a distillation column of disilicon hexachloride, and the number of powder particles produced during the distillation was counted. Meanwhile, introduced liquid was led to a distillation process of disilicon hexachloride in the same manner except that bubbling of nitrogen gas was not performed after introducing the chlorine gas, and the powder number produced during the distillation was counted. The powder number produced was classified according to diameters and is shown in Table 5. The powder number was counted using a particle counter (KL-11A manufactured by RION Co., Ltd.) and a particle sensor (KS-65 manufactured by RION co., Ltd.). The distillation conditions of disilicon hexachloride are the same as Example 1. The amount of powder is an amount included in the recovered amount of disilicon hexachloride.

TABLE 5

| Diameter of Powder particles μm | Chloride Degassing Process | No Chloride Degassing Process |
|---|---|---|
| 10 or more | Detection Limitation or lower | 3/$cm^3$ |
| 5 to 10 | | 480/$cm^3$ |
| 3 to 5 | | 750/$cm^3$ |
| 2 to 3 | | 1000/$cm^3$ or more |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing, separating and recovering disilicon hexachloride from a conversion reaction process for producing trichlorosilane by reacting hydrogen with silicon tetrachloride discharged from a polycrystalline silicon production process, comprising:

- producing polycrystalline silicon using trichlorosilane and hydrogen as raw materials, by a reaction of formula (1): $SiHCl_3+H_2 \rightarrow Si+3HCl$ and a reaction of formula (2): $4SiHCl_3 \rightarrow Si+3SiCl_4+2H_2$ in a polycrystalline silicon reaction furnace;
- condensing a gas discharged from the polycrystalline silicon reaction furnace, including silicon tetrachloride, hydrogen chloride, dichlorosilane, disilicon hexachloride, unreacted trichorosilane, and hydrogen, to produce a first condensed liquid including the silicon tetrachloride, the dichlorosilane, the disilicon hexachloride, and the unreacted trichorosilane, and to separate the hydrogen and the hydrogen chloride;
- separating the silicon tetrachloride from the first condensed liquid by distillation;
- introducing the separated silicon tetrachloride and hydrogen to a conversion furnace;
- conversion reacting silicon tetrachloride to produce trichlorosilane by a reaction of formula (3): $SiCl_4+H_2 \rightarrow SiHCl_3+HCl$ and other chlorosilanes including disilicon hexachloride in the conversion furnace;
- condensing a mixed gas discharged from the conversion furnace, which includes trichlorosilane, unreacted silicon tetrachloride, and other chlorosilanes including disilicon hexachloride, to produce a second condensed liquid;
- separating trichlorosilane and silicon tetrachloride from the second condensed liquid by distillation; and
- recovering disilicon hexachloride by distillation.

2. The method for producing, separating and recovering disilicon hexachloride according to claim 1, wherein the distillation of trichlorosilane and the distillation of silicon tetrachloride from the second condensed liquid are continuously performed in the same distillation column.

3. The method for producing, separating and recovering disilicon hexachloride according to claim 1, wherein in the distillation of disilicon hexachloride, an initial distillate is cut and a high-temperature distillate mainly including disilicon hexachloride is recovered.

4. The method for producing, separating and recovering disilicon hexachloride according to claim 1, wherein in the distillation of disilicon hexachloride, an initial distillate is cut and a middle distillate mainly including tetrachlorodisilane is recovered, and a high-temperature distillate mainly including disilicon hexachloride is also recovered.

5. The method for producing, separating and recovering disilicon hexachloride according to claim 1, wherein the distillation process of trichlorosilane, the distillation process of silicon tetrachloride, and the distillation process of disilicon hexachloride from the second condensed liquid are sequentially and continuously performed in separate distillation columns.

6. The method for producing, separating and recovering disilicon hexachloride according to claim 1, wherein, after the conversion reacting, a chlorine introduction process is provided between the distillation process of trichlorosilane and the distillation process of silicon tetrachloride, between the distillation process of silicon tetrachloride and the distillation process of disilicon hexachloride, in the course of the distillation process of silicon tetrachloride, or in the course of the distillation process of disilicon hexachloride.

7. The method for producing, separating and recovering disilicon hexachloride according to claim 6, wherein after introducing chlorine to each of the distillation processes, chlorine remaining in the residual liquid of distillation is degassed.

8. The method for producing, separating and recovering disilicon hexachloride according to claim 6, wherein inert gas is introduced to the residual liquid of distillation to degas chlorine by bubbling.

9. The method for producing, separating and recovering disilicon hexachloride according to claim 6, wherein after any one of the distillation process of trichlorosilane, the distillation process of silicon tetrachloride, and the distillation process of disilicon hexachloride, chlorine is introduced to the residual liquid of distillation to allow chlorination to progress, residual chlorine is degassed, and then the residual liquid is introduced to the next distillation process.

10. The method for producing, separating and recovering disilicon hexachloride according to claim 6, wherein after any one of the distillation process of trichlorosilane, the distillation process of silicon tetrachloride, and the distillation process of disilicon hexachloride, chlorine is introduced to the residual liquid of distillation to allow chlorination to progress, the residual liquid including the chlorine is led to the next distillation process, and the chlorine is degassed in the next distillation step.

11. The method for producing, separating and recovering disilicon hexachloride according to claim 1, wherein the conversion furnace has an in-furnace temperature set in the range of about 1000° C. to 1300° C.

12. The method for producing, separating and recovering disilicon hexachloride according to claim 1, wherein gas is discharged from the conversion furnace at a temperature of about 600° C. to 1100° C. and cooled to about −70° C. to −80° C.

13. A method for producing, separating and recovering disilicon hexachloride from a conversion reaction process for producing trichlorosilane by reacting hydrogen with silicon tetrachloride discharged from a polycrystalline silicon production process, from silicon tetrachloride which has been separated from the exhaust gas of a polycrystalline silicon producing reaction, the method comprising:

- introducing the separated silicon tetrachloride and hydrogen to a conversion furnace;
- conversion reacting silicon tetrachloride to produce trichlorosilane by a reaction of formula (3): $SiCl_4+H2 \rightarrow SiHCl_3+HCl$ and other chlorosilanes including disilicon hexachloride in the conversion furnace;
- condensing a mixed gas discharged from the conversion furnace, which includes trichlorosilane, unreacted silicon tetrachloride, and other chlorosilanes including disilicon hexachloride to produce a condensed liquid;
- separating trichlorosilane and silicon tetrachloride from the condensed liquid by distillation; and
- recovering disilicon hexachloride by distillation.

14. The method for producing, separating and recovering disilicon hexachloride according to claim 1, wherein 90 to 120 L/min of the separated silicon tetrachloride is evaporated by an evaporator, 30 to 50 $Nm^3$/min of the hydrogen is mixed therein, and the silicon tetrachloride and hydrogen are introduced to the conversion furnace.

15. The method for producing, separating and recovering disilicon hexachloride according to claim 1, wherein the mixed gas discharged from the conversion furnace includes 15 to 22 wt % of the trichlorosilane, 68 to 78 wt % of the unreacted silicon tetrachloride, 1.5 to 2.5 wt % of hydrogen, 0.5 to 1.0 wt % of hydrogen chloride, 0.5 to 1.0 wt % of dichlorosilane and 1.3 to 1.8 wt % of a polymer chlorine compound including disilicon hexachloride.

* * * * *